(12) United States Patent
Gauthier et al.

(10) Patent No.: US 9,638,412 B2
(45) Date of Patent: May 2, 2017

(54) OPTIMISED METHOD AND DEVICE LOOP COMBUSTION ON LIQUID HYDROCARBON FEEDSTOCK

(75) Inventors: Thierry Gauthier, Brignais (FR); Ali Hoteit, Lyons (FR); Ann Forret, Longes (FR)

(73) Assignees: IFP ENERGIES NOUVELLES, Rueil-Malmaison (FR); TOTAL SA, Courbevoie (FR)

( * ) Notice: Subject to any disclaimer, the term of this patent is extended or adjusted under 35 U.S.C. 154(b) by 463 days.

(21) Appl. No.: 13/120,185

(22) PCT Filed: Sep. 21, 2009

(86) PCT No.: PCT/FR2009/001113
§ 371 (c)(1),
(2), (4) Date: Mar. 22, 2011

(87) PCT Pub. No.: WO2010/034900
PCT Pub. Date: Apr. 1, 2010

(65) Prior Publication Data
US 2011/0171588 A1    Jul. 14, 2011

(30) Foreign Application Priority Data

Sep. 23, 2008  (FR) ...................................... 08 05220

(51) Int. Cl.
*F23D 3/40*  (2006.01)
*F23C 99/00*  (2006.01)
(Continued)

(52) U.S. Cl.
CPC ................. *F23C 99/00* (2013.01); *B01J 8/26* (2013.01); *B01J 8/388* (2013.01); *F23C 10/005* (2013.01);
(Continued)

(58) Field of Classification Search
CPC ........ F23C 99/00; F23C 10/005; F23C 10/01; F23C 2900/99008; B01J 8/26; B01J 8/388; B01J 2208/00902; Y02E 20/346
(Continued)

(56) References Cited

U.S. PATENT DOCUMENTS 2,665,971 A * 1/1954 Lewis ........................ B01J 8/30
422/142
3,964,882 A * 6/1976 Staudinger ...................... 48/215
(Continued)

FOREIGN PATENT DOCUMENTS

EP        1413622 A1 * 4/2004 ............. C10G 11/18
FR        802.450         9/1936
(Continued)

OTHER PUBLICATIONS

Applications of Chemical Looping Combustion of Solid Fuels by E. A. Goldstein and R. E. Mitchell, Stanford University, 2009.*

*Primary Examiner* — Avinash Savani
*Assistant Examiner* — George R Blum
(74) *Attorney, Agent, or Firm* — Fitch, Even, Tabin & Flannery, LLP (57) ABSTRACT

The invention relates to a device and to an improved method for chemical looping combustion of at least one liquid hydrocarbon feed, comprising: mixing the liquid feed with an atomization gas so as to feed it into a metal oxide particle transport zone (2), upstream from combustion zone (3), through atomization means (6) allowing to form finely dispersed liquid droplets in the atomization gas; vaporization of the liquid feed in form of droplets into contact with at least part of metal oxide particles in transport zone (2), the operating conditions in transport zone (2) being so selected that the superficial gas velocity after vaporization of the liquid feed is higher than the transport velocity of the metal oxide particles; sending all of the effluents from transport (Continued)

zone (2) to a combustion zone (3) allowing reduction of the metal oxide particles, said combustion zone (3) comprising at least one dense-phase fluidized bed. The invention can be advantageously applied to $CO_2$ capture and energy production.

21 Claims, 2 Drawing Sheets (51) Int. Cl.
- *F23C 10/00* (2006.01)
- *F23C 10/01* (2006.01)
- *B01J 8/26* (2006.01)
- *B01J 8/38* (2006.01)

(52) U.S. Cl.
CPC ..... *F23C 10/01* (2013.01); *B01J 2208/00902* (2013.01); *F23C 2900/99008* (2013.01); *Y02E 20/346* (2013.01)

(58) Field of Classification Search
USPC ........................ 431/7, 11; 110/190
See application file for complete search history.

(56) References Cited

U.S. PATENT DOCUMENTS

| | | | |
|---|---|---|---|
| 4,064,038 A * | 12/1977 | Vermilion, Jr. | 208/120.01 |
| 4,085,189 A * | 4/1978 | Dunn, Jr. | C22B 34/1209 423/148 |
| 4,139,351 A * | 2/1979 | Ostertag et al. | 95/268 |
| 4,179,282 A * | 12/1979 | Rubio | 75/495 |
| 4,267,801 A * | 5/1981 | Robinson | 122/4 D |
| 4,427,537 A * | 1/1984 | Dean | C10G 11/18 208/113 |
| 4,744,883 A * | 5/1988 | Hettinger, Jr. | 208/108 |
| 4,788,919 A * | 12/1988 | Holm et al. | 110/347 |
| 4,828,680 A * | 5/1989 | Green | C10G 11/18 208/120.2 |
| 4,849,091 A * | 7/1989 | Cabrera et al. | 208/113 |
| 5,324,696 A * | 6/1994 | Bonifay | C10G 11/182 208/164 |
| 6,142,457 A * | 11/2000 | Holtan et al. | 261/78.2 |
| 6,667,022 B2 * | 12/2003 | Cole | 423/437.1 |
| 8,241,523 B2 * | 8/2012 | Apanel et al. | 252/373 |
| 2004/0062689 A1 * | 4/2004 | Gauthier | B01F 3/04049 422/139 |
| 2004/0079679 A1 * | 4/2004 | Gauthier | B01J 8/0025 208/113 |
| 2005/0175533 A1 * | 8/2005 | Thomas | C01B 3/063 423/657 |
| 2008/0134579 A1 * | 6/2008 | Kulkarni | C10J 3/56 48/73 |
| 2008/0134666 A1 * | 6/2008 | Kulkarni | C01B 3/12 60/227 |
| 2008/0164443 A1 * | 7/2008 | White et al. | 252/373 |
| 2009/0020405 A1 * | 1/2009 | Fan | B01J 19/00 201/12 |
| 2010/0050654 A1 * | 3/2010 | Chiu | C10J 3/54 60/780 |
| 2010/0279181 A1 * | 11/2010 | Adams, II | B01D 53/265 429/410 |
| 2011/0097673 A1 * | 4/2011 | Forret | B01J 8/22 431/2 |
| 2011/0120560 A1 * | 5/2011 | Proll | B01J 8/1818 137/1 |
| 2011/0129408 A1 * | 6/2011 | Jadhav | 423/437.1 |
| 2011/0139679 A1 * | 6/2011 | Bories | B01J 8/34 208/78 |
| 2012/0148484 A1 * | 6/2012 | Gauthier | C10J 3/725 423/648.1 |
| 2013/0118957 A1 * | 5/2013 | Hoteit | F23C 10/005 209/142 |
| 2014/0335461 A1 * | 11/2014 | Guillou | F23C 10/005 431/7 |
| 2015/0241056 A1 * | 8/2015 | Bollas | F23C 99/006 431/7 |
| 2015/0322356 A1 * | 11/2015 | Pavone | C10J 3/56 432/4 |

FOREIGN PATENT DOCUMENTS

| | | | | |
|---|---|---|---|---|
| FR | | 2695045 A1 * | 3/1994 | B01J 38/32 |
| FR | | 2839269 A1 * | 11/2003 | B01F 3/04049 |
| FR | EP | 1413622 A1 * | 4/2004 | B01J 8/0025 |
| FR | | 2 895 413 A1 | 6/2007 | |
| JP | | 05212298 A * | 8/1993 | |
| WO | WO 2008/036902 A2 | | 3/2008 | |

* cited by examiner

OPTIMISED METHOD AND DEVICE LOOP COMBUSTION ON LIQUID HYDROCARBON FEEDSTOCK

FIELD OF THE INVENTION

The invention relates to chemical looping combustion of liquid feeds, notably to a new technology for implementing this method.

BACKGROUND OF THE INVENTION

Chemical looping combustion of liquid feeds consists in contacting a liquid hydrocarbon feed with a metal oxide at high temperature. The metal oxide then yields part of the oxygen it contains, which takes part in the combustion of the hydrocarbons. After this combustion, the fumes contain predominantly carbon oxides, water and possibly hydrogen. In fact, it is not necessary to contact the air with the hydrocarbons, and the fumes are then predominantly made up of combustion gases and possibly of a dilution gas used for transport and fluidization of the particles (water vapour for example). It is thus possible to produce predominantly nitrogen-free fumes with high $CO_2$ contents (>90 vol. %) allowing to consider $CO_2$ capture, then storage. The metal oxide that has taken part in the combustion is then transported to another reaction enclosure where it is contacted with air in order to be re-oxidized. If the particles from the combustion zone are free of fuel, the gases coming from this reaction zone are predominantly free of $CO_2$—which is then present only as traces, for example at concentrations below 1-2 vol. %—and they essentially consist of oxygen-depleted air, as a result of the oxidation of the metal particles.

Implementing a chemical looping combustion method requires large amounts of metal oxides in contact with the fuel. These metal oxides are generally contained either in ore particles or in particles resulting from industrial treatments (residues from the iron and steel industry or from the mining industry, used catalysts from the chemical industry or refining). It is also possible to use synthetic materials such as, for example, alumina or silica-alumina supports on which metals that can be oxidized (nickel oxide for example) have been deposited. Depending on the metal oxides used, the amount of oxygen theoretically available varies considerably and it can reach high values close to 30%. However, according to the materials, the maximum capacity of oxygen really available does generally not exceed more than 20% of the oxygen present. The capacity of these materials to yield oxygen does therefore globally not exceed more than some percents by weight of the particles and it varies considerably from one oxide to another, generally ranging from 0.1 to 10%, often between 0.3 and 1 wt. %. Implementation with a fluidized bed is therefore particularly advantageous for conducting the combustion. In fact, the finely divided oxide particles circulate more readily in the combustion and oxidation reaction enclosures, and between these enclosures, if the properties of a fluid are conferred on the particles (fluidization).

Chemical looping combustion allows to produce energy, in form of vapour or electricity for example. The feed combustion heat is similar to that encountered in conventional combustion. It corresponds to the sum of the combustion and oxidation heats in the chemical loop. The distribution among the combustion and oxidation heats greatly depends on the metal oxides used for conducting the chemical looping combustion. In some cases, the exothermicity is distributed among the oxidation and the reduction of the metal. In other cases, the oxidation is highly exothermic and the reduction is endothermic. In any case, the sum of the oxidation and reduction heats is equal to the combustion heat of the fuel. The heat is extracted by exchangers arranged inside, on the wall or added to the combustion and/or oxidation enclosures, on the fume lines or on the metal oxide transfer lines.

The combustion of solid feeds and of gaseous feeds is well described in the literature. The principle of the combustion of liquid feeds is known (patent application FR-08/02,450). However, in relation to the gaseous and solid feeds, chemical looping combustion of liquid feeds involves significant specific features that are detailed below.

Upon contact between the liquid feed and the metal oxides, part of the feed is vaporized but coke settles on the particles due to the thermal cracking resulting from the liquid fuel being exposed to very high temperatures. The heavier the feeds, the more they tend to form large amounts of coke. Thus, on a diesel fuel or a vacuum distillate, the amount of coke formed is of the order of 1 to 20% of the feed injected. On an atmospheric residue or a vacuum residue, the amount of coke formed ranges from 10 to 80% depending on the nature of the feed injected. This coke formation depends on the nature of the feeds (coke precursor concentration, which can be determined by measuring the asphaltene content or the Conradson carbon content). It also depends on the contacting conditions (temperature, ratio of hydrocarbon flow rate to oxide flow rate, droplet diameter, particle diameter, etc.). After contact between the feed and the metal oxides, two types of combustion reaction between the hydrocarbons and the metal oxides take place, the first one, easier, resulting from a contact between the gaseous hydrocarbon and the oxide particles, and the second one, slower, resulting from the gasification of the coke that has settled on the particles to synthesis gas that will then burn rapidly with the metal oxides.

It is therefore important to minimize the formation of coke upon injection of the liquid feed in order to have combustion reactions as fast as possible.

On the other hand, considering the inevitable coke formation, it is important to make sure that the particles that return to the combustion zone stay there long enough to remove all the coke formed. Unlike the case where the feed is solid, it is indeed here impossible to consider separating the still coked oxide particles from the non-coked particles. In a solid feed combustion, the density difference, the size difference, or even the magnetic properties difference between the coal particles and the oxide particles is great. In the case of a liquid feed, the particles in the combustion zone are exclusively coked metal oxide particles and non-coked metal oxide particles, whose properties are very close.

The present invention allows to overcome all the aforementioned problems linked with the implementation of chemical looping combustion of liquid feeds.

DESCRIPTION OF THE INVENTION

Summary of the Invention

The invention relates to an improved method for chemical looping combustion of at least one liquid hydrocarbon feed, comprising:
   atomizing the liquid feed with an atomization gas so as to feed it into a metal oxide transport zone (2), upstream from combustion zone (3), through atomization means (6) allowing to form finely dispersed liquid droplets in the atomization gas;

vaporization of the liquid feed in form of droplets into contact with at least part of the metal oxides in transport zone (2), the operating conditions in transport zone (2) being so selected that the superficial gas velocity after vaporization of the liquid feed is higher than the transport velocity of the metal oxide particles;

sending all of the effluents from transport zone (2) to a combustion zone (3) allowing reduction of the metal oxides, said combustion zone (3) comprising at least one dense-phase fluidized bed.

Dense-phase combustion zone (3) is advantageously so dimensioned that the hydrodynamics of the particles in the dense-phase fluidized bed(s) correspond to at least two perfectly stirred reactors in series or to at least two fluidized bed stages in series.

Atomization means (6) are preferably arranged on the wall of the reactor of transport zone (2) and so selected as to form a jet oriented towards the centre of transport zone (2).

The jet preferably has the shape of a pencil with an opening angle in the vertical plane ranging between 7° and 20°, and an opening angle in the horizontal plane ranging between 30° and 80°.

Preferably, the liquid feed droplets injected have a Sauter mean diameter ranging between 0.5 and 2 times the mean diameter of the particles.

The metal oxide particles can be fed into transport zone (2) from oxidation zone (1) through a line (13), or through recycle of the particles coming from combustion zone (3), or in form of a mixture of re-oxidized metal oxides from oxidation zone (1) and of metal oxides from combustion zone (3).

Metal oxides coming directly from oxidation zone (1) can be fed into the dense-phase fluidized bed(s) of combustion zone (3), so that a fraction less than or equal to 50% of the total amount of metal oxides circulating between oxidation zone (1) and combustion zone (3) takes part in the vaporization of the liquid feed in transport zone (2).

In an embodiment of the method according to the invention, the gas and the particles from transport zone (2) are fed together to the base of at least one fluidized bed of combustion zone (3), the upper part of transport zone (2) being equipped with dispersion means in said fluidized bed.

In another embodiment of the method according to the invention, the gas and the particles are separated at the outlet of transport zone (2), either to feed separately into combustion zone (3) the gas freed of the major part of the metal oxides and the metal oxide freed of the major part of the gas, or to feed into combustion zone (3) the metal oxide freed of the major part of the gas, and to discharge the gas phase out of combustion zone (3).

Preferably, the liquid feed is made up of hydrocarbon fractions, alone or in admixture, less than 10% thereof having a boiling point temperature below 340° C.

Preferably, at least one dense-phase fluidized bed of combustion zone (3) is equipped with means (25) allowing the flow of the metal oxide particles to be staged.

In an embodiment, combustion zone (3) comprises at least two dense-phase fluidized bed reactors (3a) and (3b), arranged one above the other, the outer walls of these two reactors coinciding, so as to extend by continuity the dense phase of reactor (3a) in the fluidized dense phase of reactor (3b).

The invention also relates to a device for chemical looping combustion of at least one liquid hydrocarbon feed, comprising:

a substantially elongate and substantially vertical metal oxide transport zone (2) comprising:
liquid feed injection means comprising means for mixing the liquid feed with an atomization gas and liquid feed atomization means (6) arranged on the periphery of said transport zone,
feed means for at least part of the metal oxides,
a combustion zone (3) for the vaporized feed through metal oxides reduction, comprising at least one dense-phase fluidized bed, transport zone (2) being arranged upstream from said combustion zone (3).

Preferably, combustion zone (3) comprises a number of dense-phase fluidized beds, in one or more combustion reactors, greater than two.

The metal oxide feed means can comprise a transport line (13) from oxidation zone (1), and/or a recycle line for the particles coming from combustion zone (3).

Transport zone (2) can comprise, at the outlet thereof, dispersion means for gas and solid particles dispersion in combustion zone (3).

Transport zone (2) can comprise, at the outlet thereof, gas and solid particles separation means.

The method according to the invention can be used for $CO_2$ capture. Preferably, the $CO_2$ capture rate S is above 90%.

The method according to the invention can be used for energy production.

DETAILED DESCRIPTION

The object of the invention is to provide a layout of reaction zones suited for chemical looping combustion of a liquid, allowing controlled and optimum injection of liquid into contact with metal oxides and control of the residence time of the particles in the combustion zone. This allows to achieve the main part of the combustion of the coke deposited on the particles in the combustion reactor and therefore to have, in the gaseous effluents of the oxidation reactor, maximum 10%, preferably 5% or 2%, or even less, of the $CO_2$ resulting from the combustion of the liquid feed fed into the chemical looping combustion process. Thus, the $CO_2$ capture rate S (defined as the ratio of the $CO_2$ emitted in the fumes of the combustion zone through metal oxide reduction to the total $CO_2$ emissions of the process) is preferably above 90%.

In fact, in the fumes of the combustion zone through metal oxide reduction, the $CO_2$ is highly concentrated and it can be transported to storage zones. On the contrary, the fumes of the oxidation zone contain only small $CO_2$ proportions diluted in the nitrogen of the air, which makes the $CO_2$ storage possibilities disadvantageous.

In the chemical looping combustion method according to the invention, vaporization of the liquid feed occurs upon contact with the hot metal oxide coming from the oxidation reactor or which has already been in contact with the hydrocarbons. Control of the liquid feed vaporization conditions for minimizing coke formation is provided by injecting the finely atomized liquid feed, preferably in form of droplets whose size is close to the size of the metal oxide particles.

The droplets are injected into an oxide metal transport zone so that renewal of the particles upon contact with the liquid feed droplets is provided by a controlled circulation movement.

It has to be underlined that the injection of droplets into a dense fluidized bed, wherein the particles fluidization velocity is lower than the particle transport velocity and wherein the circulation of solids intrinsically depends on the fluidization quality and on the reactor geometry, is in this sense not satisfactory. The droplets are therefore preferably injected into a line wherein the particles are transported, renewal of the particles in contact with the droplets depending then only on the pressure balance at the boundaries of the transport line, which can be adjusted when dimensioning the facility or during operation by adjusting the pressure difference between the elements of the circulation loop, by varying the opening or closing of the solid circulation valves, or by adjusting the fluidization flow rates. In the method according to the invention, the transport zone is therefore generally substantially elongate and preferably vertical. The operating conditions at the boundaries of this transport zone (flow rates, pressure, etc.) are so selected that the superficial gas velocity after vaporization of the liquid feed is greater than the particle transport velocity. What is referred to as the "superficial gas velocity after vaporization of the liquid feed" is the flow rate of the gas phase made up of the gases coming from the liquid feed and of the auxiliary gases intended to fluidize the catalyst and to atomize the liquid feed, in relation to the section of the reactor in the transport zone.

The mass ratio between the metal oxide flow rate and the liquid flow rate typically ranges between 2 and 100, preferably between 5 and 30, so as to provide the droplets with enough energy by contact with the particles on the one hand, to maximize the interfacial area of the particles that will condition the thermal exchanges and the coke deposit on each part on the other hand, and to provide thereafter, through vaporization and reaction of a fraction of the liquid feed, transport of the particles through the transfer of movement quantity from the gas phase (consisting of the gases coming from the liquid feed and of the auxiliary gases intended to fluidize the catalyst and to atomize the liquid feed) to the particles. The droplets are preferably injected on the periphery of the reactor where the particles are transported, through the agency of a large number of atomization means arranged around the reactor that form a jet pointed at the centre of the reactor.

Preferably, the jet form by each atomizer has the shape of a pencil, the opening of the jet allowing to cover a maximum reactor section so as to produce a curtain of droplets that has to be traversed by the catalyst circulation.

Preferably, the opening angle of the pencil projected in the horizontal plane ranges between 30° and 80°.

Preferably, the opening angle of the pencil in the vertical plane ranges between 7° and 20° in order to limit the thickness of the jet formed.

The droplet jet consists of droplets suspended in a gas (preferably water vapour, or a water vapour-$CO_2$ mixture, or the recycled fumes) that has at least partly been used to atomize the droplets.

The mass ratio of the gas injected with the droplets advantageously ranges between 1 and 15 wt. %, preferably between 3 and 8 wt. %.

The droplets and the gas injected with the droplets form a jet that generally reaches the transport zone at an average superficial velocity ranging between 10 and 150 m/s, preferably between 30 and 100 m/s. It is important to inject the gas-droplet suspension into the transport zone at a high velocity so as to enter the particle flow.

The atomization means allowing to form small-size droplets on high liquid flow rates in the presence of gas are known to the person skilled in the art. It is possible to use, for example, venturi type injectors, where atomization of the liquid occurs in the presence of gas through passage in a restriction, then the suspension flows through a divergent diffuser prior to shaping in a terminal piece. It is also possible to use an impact type injector containing a target onto which the liquid flows at high velocity and is sheared by a gas stream prior to being transported to a jet shaping terminal piece. More complex systems already described in the literature can also be considered. These injectors allow to form, on high unit flow rates (up to 30-60 $m^3$/h liquid), droplets whose size is close to 100 microns or less, with gas flow rates ranging between 3 and 8 wt. % of the liquid while limiting the energy dissipation to pressure drops below 10-15 bars.

Advantageously, the chemical looping combustion reaction is carried out with metal oxide particles whose mean diameter (Sauter diameter) ranges between 50 and 300 microns, the injected liquid feed droplets having a Sauter mean diameter ranging between 0.5 and 2 times the mean diameter of the particles, preferably ranging between 0.8 and 1.2 times the mean diameter of the particles.

The metal oxide particles flowing through the transport zone are, prior to contact with the liquid feed, transported in a dense flow (in the absence of the gas resulting from spraying and reaction).

Prior to contacting with the droplets, the void fraction of the suspension of metal oxide particles advantageously ranges between 0.5 and 0.9, preferably close to between 0.7 and 0.9 volume parts. The transport velocity of the particle suspension prior to contact with the liquid feed advantageously ranges between 0.3 and 5 m/s, preferably close to between 0.6 and 2 m/s. Under such conditions, the particles flow in a sufficiently dense manner through the transport zone, which allows good dispersion of the heat supplied by the particles to the droplets and uniform distribution of the coke resulting from the contact between the liquid and the particles among all the particles circulating in the transport zone.

After vaporization of a large part of the hydrocarbons injected into contact with the particles, the superficial gas velocity in the transport zone increases, which allows the metal oxides to be transported while minimizing the energy dissipation in form of pressure drop. In fact, the volume expansion of the gas phase causes dilution of the particles and acceleration thereof, which increases the dilution even further.

Combustion of the vaporized hydrocarbons, coking of the non-vaporized fractions and reactions of gasification of the coke formed are initiated in the transport zone. This zone preferably has the shape of a substantially elongate reactor. In order to optimize contacting between the liquid and the metal oxides, the diameter of the transport reactor is limited, when possible, to a diameter ranging between 2 and 3 meters. The height of the reactor depends on the pressure balance of the facility and it reasonably ranges between 5 and 50 meters, preferably between 10 and 30 meters. The mass flow rates of the particles transported in the transport zone range between 50 and 1500 $kg/s/m^2$, preferably between 300 and 1000 $kg/s/m^2$, and the gas velocity in the upper part of the transport zone does generally not exceed 30 m/s, in order to limit the pressure drop in the transport zone. The gas velocity results from the vaporization of part of the hydrocarbon feed that is cracked. It can be advantageously controlled by adding a transport gas downstream from the feed injection device (fumes for example).

The residence time of the particles and of the gas in the transport zone is however generally too short to consider total combustion of the hydrocarbon injected, which besides requires very large amounts of metal oxides. In fact, the transport velocities of the gas in the transport zone reasonably range between 2 and 30 m/s, the particles circulating on average two to three times as slowly as the gas. Under such conditions, the residence time of the gas and of the particles in the transport reactor is less than one minute, which may be too fast to consider total combustion of the hydrocarbons, and in particular of the coke deposited on the particles.

Depending on the implementation conditions, in order to complete the combustion of the hydrocarbons that have been vaporized and of the coke, it is necessary to increase the metal oxide-hydrocarbon contacting time. This is advantageously achieved in the combustion zone by means of one or more dense-phase fluidized beds, wherein the superficial gas velocity generally ranges between the minimum particle fluidization velocity and the velocity limiting the transport regime. In practice, for the type of particles used and the grain size considered, the superficial gas velocity advantageously ranges between 0.05 and 2 m/s, preferably between 0.1 and 1 m/s. The void fraction of the fluidized bed advantageously ranges between 0.4 and 0.8 in the dense phase, preferably between 0.5 and 0.7 parts by volume. The height of the dense phase of the fluidized bed is advantageously determined according to the residence time of the particles in the dense phase in order to allow sufficient time for the progress of the combustion of the coke deposited on the particles. Thus, the overall residence time of the particles in the transport zone and in the fluidized bed(s) of the combustion zone downstream from the transport zone often ranges between 1 and 15 minutes, preferably between 1 and 5 minutes, depending on the reactivity of the metal oxide used for the chemical looping combustion.

Transport zone (2) allowing contact between the liquid feed and the metal oxide particles, which advantageously has the shape of a substantially elongate reactor, preferably opens into the first dense-phase fluidized bed of combustion zone (3). Many layouts are possible.

Thus, it is possible to introduce the gas and the particles together at the base of the fluidized bed of combustion zone (3) by equipping the upper part of transport zone (2) with means allowing dispersion thereof in the fluidized bed that are well known to the person skilled in the art (lateral vents on the reactor walls, widening and holed plate closing the upper part of the transport reactor, distribution of the gas and of the particles in the dense phase of the fluidized bed through optimized dimensioning of the holed plate orifices, etc.).

It is also possible to complete transport zone (2) with a gas-particles separator and to separately introduce into dense-phase fluidized bed combustion zone (3) the gas freed of the major part of the metal oxides and the metal oxide freed of the major part of the gas.

In a variant, it is also possible to consider completing transport zone (2) with a gas-particle separator and to separately introduce into the dense-phase fluidized bed combustion zone the metal oxide freed of the major part of the gas and to discharge the gas phase of the reaction zone by bypassing dense-phase fluidized bed zone (3). Under such conditions however, the gas phase leaving the transport zone is generally incompletely burnt and contains high proportions of $CO_2$, $H_2$ or unburnt hydrocarbons, depending on the operating conditions and particularly on the flow rate of the metal oxide stream circulating in the transport zone.

In order to complete the combustion reactions, metal oxides coming directly from oxidation zone (1) are advantageously fed into combustion zone (3) comprising at least one dense-phase fluidized bed.

In fact, the amount of metal oxides required for good contacting with the liquid feed does not correspond, in the majority of cases (it depends on the nature of the metal oxides used and on their oxygen transfer capacity), to the stoichiometric amount required for conducting the reaction or for providing the thermal balance of the chemical loop. The amount of metal oxide particles required for good contacting with the liquid feed and for providing the combustion stoichiometry in transport zone (2) generally corresponds to less than 50% of the flow rate of metal oxides circulating between oxidation zone (1) and combustion or reduction zone (3).

Preferably, a fraction corresponding to 50 to 95% of the total amount of metal oxides circulating between oxidation zone (1) and combustion zone (3) is therefore directly fed into the dense-phase fluidized bed of combustion zone (3) coming from oxidation zone (1), according to the oxygen carrier selected, this proportion tending towards lower proportions when the oxygen transport capacity increases.

Another essential aspect of the invention relates to the control of the residence time of the particles in combustion zone (3), which is performed by means of one or more dense-phase fluidized beds. The dense-phase fluidized bed is a contactor wherein axial mixing of the particles is very intense. In first approximation, one may even assume that the particle stream is perfectly mixed. In a perfectly mixed reactor, the coke concentration of the particles leaving the reactor is equal to the average concentration of the particles within the reactor.

Now, in order to best optimize this reactor and to minimize the required reaction volume, it is advisable to have a flow that is close to the piston flow, which allows to have a homogeneous particle residence time and a narrow residence time distribution around the time required for the combustion reaction while minimizing the reaction volume.

Keeping a conventional fluidized bed would necessarily cause coked particles to be carried to the air reactor at the combustion reactor outlet, which would be harmful to $CO_2$ capture. Indeed, the coked particles carried along would burn upon contact with air, which would lead to significant $CO_2$ emissions in the oxidation reactor effluents and be harmful to the $CO_2$ capture efficiency of the chemical loop facility.

Figure 1:
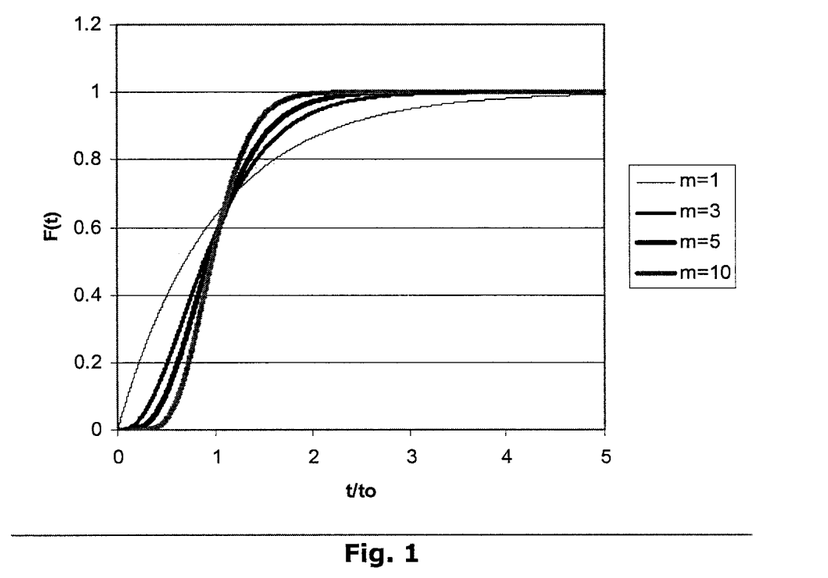
FIG. 1 diagrammatically shows the distribution of the residence times in a reactor made up of m perfectly stirred reactors as a function of the dimensionless time constant τ=volume/flow rate.

It is well known that arranging in series several perfectly stirred reactors allows to get close to the piston flow. FIG. 1 shows the effect of the number m of perfectly stirred reactors in series, in form of a cumulative distribution function of the residence times in a reactor made up of m perfectly stirred reactors in series as a function of the dimensionless time constant $\tau$=volume/flow rate.

In order to maintain an optimum overall $CO_2$ capture rate S (notably above 90% or even 95%) in the chemical looping combustion process while maintaining reasonable reactor sizes, we have observed that it is advantageous to use a dense-phase fluidized bed combustion zone (3) having hydrodynamic characteristics corresponding to at least two perfectly stirred reactors in series or at least two dense-phase fluidized beds in series. For example, it is possible to implement in the fluidized bed particle hydrodynamics similar to the hydrodynamics that would be obtained in three perfectly stirred reactors in series. Under such conditions, less than 1% of the particles stay in the reactor during 15% of the average residence time defined by the fluidized bed dense phase volume and divided by the total flow rate of particles circulating in the reactor, 5% of the particles staying less than 0.27 times this average residence time, 20% of the particles staying less than 0.57 times this average residence time, the average residence time being defined as the time required for total combustion in a reactor under piston flow conditions. In terms of performances, it can be estimated that, under such conditions, it would be possible to carry out combustion of 82% of the coke in a reactor having the same proportion of particles as a reactor wherein the flow of the particles is a perfect piston flow where 90% coke combustion would then be obtained.

In the same reactor, with an identical particle inventory but with particle hydrodynamics in the fluidized bed corresponding to two perfectly stirred reactors in series, the coke combustion is approximately 78%. In the same reactor with an identical particle inventory, but with particle hydrodynamics in the fluidized bed corresponding to a single perfectly stirred reactor in series, only 69% of the combustion of the coke deposited on the particles would be performed. The amount of coke carried to oxidation zone (1) thus decreases as a function of the nature of the particle hydrodynamics in this reactor.

Assuming that the coke deposited on the particles represents 45% of the hydrocarbon feed and considering that the vaporized fractions burn more rapidly than the coke, one can deduce therefrom that the $CO_2$ emitted in the oxidation zone represents 14% of the $CO_2$ emitted by the entire facility when using a perfectly stirred reactor in dense-phase combustion zone (3) following transport zone (2), whereas this value falls to less than 10% when using in dense-phase combustion zone (3) particle hydrodynamics corresponding to more than N=2 perfectly stirred reactors in series. This value falls to approximately 8% when using in dense-phase combustion zone (3) particle hydrodynamics corresponding to more than N=3 perfectly stirred reactors in series. The closer the particle hydrodynamics in the dense phase are to the piston flow in the dense-phase fluidized bed zone, the higher the $CO_2$ capture efficiency of the facility.

BRIEF DESCRIPTION OF THE FIGURES

FIG. 2 illustrates example 2. FIG. 3 relates to examples 3 and 4.

Figure 2:
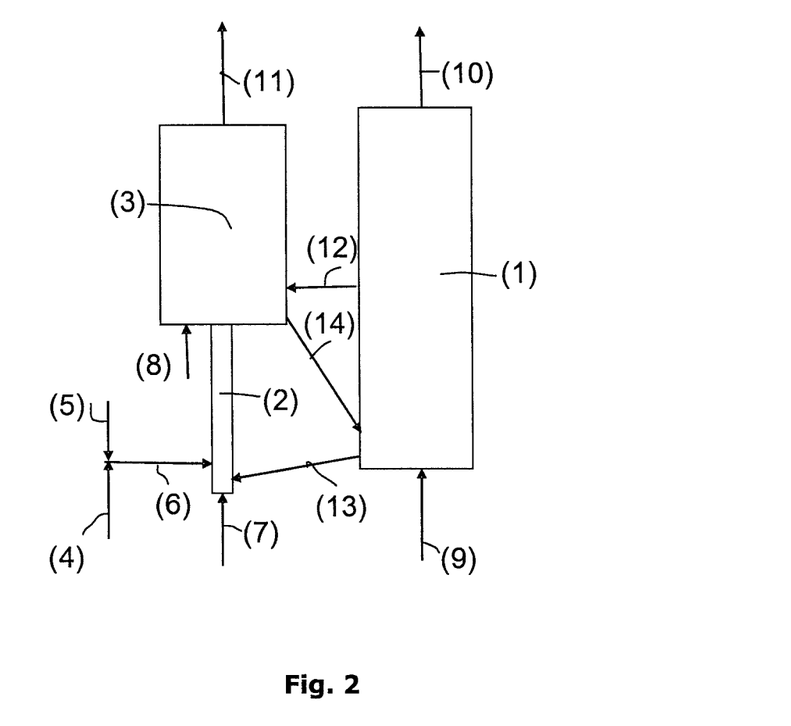
FIGS. 2, 3, 4 describe process schemes allowing implementation of various embodiments of the invention.

FIG. 2

Combustion is carried out in the metal oxide reaction zones: transport zone (2) and combustion zone (3). The liquid feed introduced through line (4) is mixed with an atomization gas introduced through line (5) and the mixture is fed into transport zone (2), which is a reactor of substantially elongate shape, through atomization means (6) allowing to form fine liquid droplets dispersed in the atomization gas. Several injection points are possible. Atomization means (6) are distributed on the wall of the reactor of transport zone (2), substantially in the lower part thereof. Transport zone (2) opens into dense-phase fluidized bed combustion zone (3) where the gas phase and the solid phase are dispersed. All of these gaseous effluents flow into dense-phase fluidized bed combustion zone (3) and leave it through line (11). The gas phase is then essentially made up of $CO_2$ or of ($CO$, $H_2$) depending on the stoichiometric and reaction conditions applied, water vapour and sulfur and nitrogen oxides, . . . . A fluidization gas is introduced through a line (8) at the base of dense-phase combustion zone (3) and it allows homogeneous fluidization over the entire section. This fluidization gas can advantageously be water vapour, a fraction of the gaseous effluents from line (11) or a mixture of water vapour and of effluent fractions from line (11). In order to limit particle entrainment downstream, cyclones or other dedusting means known to the person skilled in the art are arranged in dense-phase combustion zone (3) or at the outlet thereof on line (11).

The metal oxides are discharged to oxidation zone (1) through one or more transport lines (14) that withdraw the solid from the fluidized bed of combustion zone (3) or the return legs of the cyclones providing dedusting of the gaseous effluents of combustion zone (3).

In oxidation zone (1), the metal oxide reduced by the combustion of the liquid feed is oxidized again on contact with the air introduced through a line (9) into a fluidized reactor operating under either dense phase or circulating bed conditions. The gaseous effluents containing essentially oxygen-depleted air leave oxidation zone (1) in the upper part thereof through line (10) after being dedusted using means known to the person skilled in the art. Oxidation zone (1) can consist of a circulating fluidized bed (superficial gas velocity above particle transport velocity) or of a dense-phase fluidized bed (superficial gas velocity below particle transport velocity and above minimum fluidization velocity). In the case of a circulating fluidized bed, part of the oxide circulating in oxidation zone (1) can be recycled at the reactor outlet to the bottom of oxidation zone (1) in the vicinity of air supply means after prior separation by separation means such as cyclones.

The metal oxide, once oxidized again, is then sent for combustion partly to transport zone (2) through one or more transport lines (13) opening into transport zone (2) upstream from means (6) allowing atomization of the feed. A fluidization gas (7) (vapour for example) is fed into zone (2) upstream from transport lines (13) to provide fluidization upstream from the contact with the liquid feed. The rest of the metal oxide is directly sent to dense-phase combustion zone (3) through transport line (12) that bypasses transport zone (2).

The metal oxide taking part in the combustion reaction in transport zone (2) comes, in this example, from oxidation zone (1) through line (13). It is also possible to consider supplying metal oxide transport zone (2) with a recycle of the particles coming from dense-phase combustion zone (3) or with a mixture of re-oxidized metal oxides coming from oxidation zone (1) and of metal oxides coming from combustion zone (3).

Figure 3:
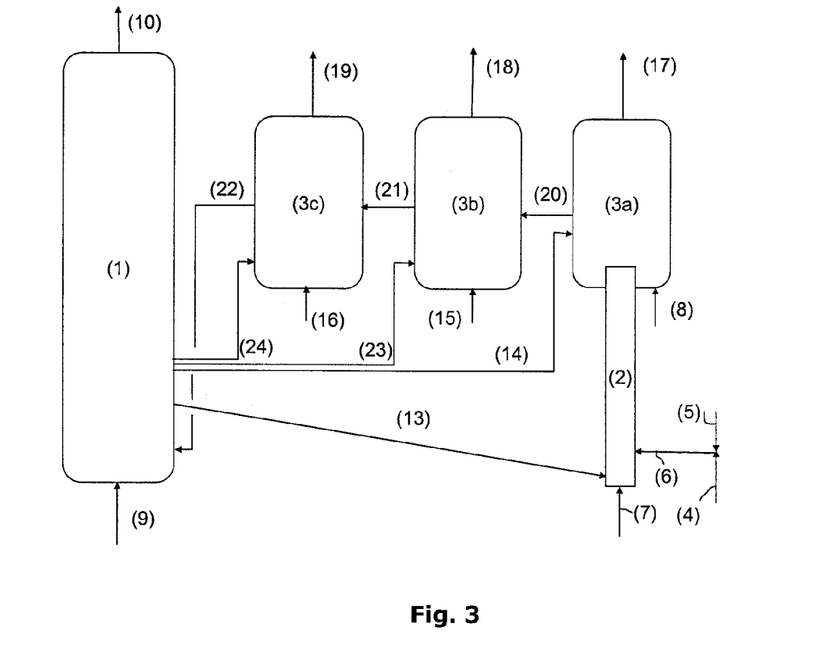

FIG. 3

FIG. 3 describes another embodiment of the invention wherein combustion zone (3) comprises three dense-phase fluidized bed reactors in series (3a), (3b) and (3c).

Chemical looping combustion is carried out by reduction of the metal oxides in reactors (2) and (3a, 3b and 3c).

The liquid feed introduced through line (4) is mixed with an atomization gas introduced through line (5) and the mixture is fed into transport zone (2), which is a substantially elongate reactor, through atomization means (6) allowing to form fine liquid droplets dispersed in the atomization gas. Several injection points are possible. Atomization means (6) are distributed on the wall of the reactor of transport zone (2), substantially in the lower part thereof. Transport zone (2) opens into reactor (3a) of the dense-phase fluidized bed combustion zone where the gas phase and the solid phase are dispersed. All of these gaseous effluents flow into reactor (3a) of the dense-phase fluidized bed combustion zone and leave it through line (17). The gas phase is then essentially made up of $CO_2$ or of ($CO$, $H_2$) depending on the stoichiometric and reaction conditions applied, water vapour and sulfur and nitrogen oxides, . . . . A fluidization gas is introduced through a line (8) at the base of the dense-phase combustion zone into reactor (3a) and it allows homogeneous fluidization over the entire section. This fluidization gas can advantageously be water vapour, a fraction of the gaseous effluents from line (17) or a mixture of water vapour and of effluent fractions from line (17). In order to limit particle entrainment downstream, cyclones or other dedusting means known to the person skilled in the art are arranged in dense-phase combustion zone (3a) or at the outlet thereof on line (17).

The metal oxides are discharged to two reactors (3b) and (3c), fluidized independently by gases flowing in through lines (15) and (16), wherein the particles are fluidized in dense phase (at a velocity below the particle transport velocity). In these reactors, combustion of the coke deposited on the particles is completed. The gaseous combustion effluents leave dense-phase fluidized reactors (3b) and (3c) respectively through lines (18) and (19), essentially made up of $CO_2$ or of ($CO$, $H_2$) depending on the stoichiometric and reaction conditions applied, water vapour and sulfur and nitrogen oxides. The fluidization gases introduced through lines (15) and (16) at the base of reactors (3b) and (3c) allow homogeneous fluidization over the entire section. This fluidization gas can advantageously be water vapour, a fraction of the gaseous effluents from lines (17), (18) or (19) or a mixture of water vapour and of effluent fractions from lines (17), (18) or (19). In order to limit particle entrainment downstream, cyclones or other dedusting means known to the person skilled in the art are arranged in reactors (3b) and (3c) or at the outlet thereof on lines (18) and (19).

The metal oxide on which the essential part of the deposited coke has been burned by successive passage through reactors (2), (3a), (3b) and (3c) is then discharged to oxidation zone (1) through one or more transport lines that withdraw the solid from the fluidized bed of reactor (3c) or the return legs of the cyclones providing dedusting of the gaseous effluents of reactor (3c).

In oxidation zone (1), the metal oxide reduced by the combustion of the liquid feed is oxidized again on contact with the air introduced into a fluidized reactor operating under either dense phase or circulating bed conditions. The gaseous effluents containing essentially oxygen-depleted air leave oxidation zone (1) in the upper part thereof after being dedusted using means known to the person skilled in the art. Oxidation zone (1) can consist of a circulating fluidized bed (superficial gas velocity above particle transport velocity) or of a dense-phase fluidized bed (superficial gas velocity below particle transport velocity and above minimum fluidization velocity). In the case of a circulating fluidized bed, part of the oxide circulating in oxidation zone (1) can be recycled at the reactor outlet to the bottom of oxidation zone (1) in the vicinity of air supply means after prior separation by separation means such as cyclones.

The metal oxide, once oxidized again, is then sent for combustion partly to transport zone (2) through one or more transport lines (13) opening into transport zone (2) upstream from means (6) allowing atomization of the feed. A fluidization gas (vapour for example) is fed through a line (7) upstream from transport lines (13) to provide fluidization upstream from the contact with the liquid feed. The rest of the metal oxide is directly sent to dense-phase combustion zone (3) through transport line (14), (23) and (24) and bypasses transport zone (2). The distribution of the oxide flow rates among lines (13), (14), (23) and (4) is advantageously performed according to the distribution of the combustion in each zone with the aim of minimizing the flow rate of metal oxides circulating in zones (3a), then (3b) and (3c). It is also possible to inject all of the metal oxide through line (13), through line (13) and line (14), or through lines (13), (14) and (23).

The metal oxide taking part in the combustion reaction in transport zone (2) comes, in this example, from the oxidation zone through line (13). It is also possible to consider supplying metal oxide transport zone (2) with a recycle of the particles coming from dense-phase combustion zone (3a, 3b or 3c) or with a mixture of re-oxidized metal oxides coming from oxidation zone (1) and of metal oxides coming from zones (3a, 3b or 3c).

Figure 4:
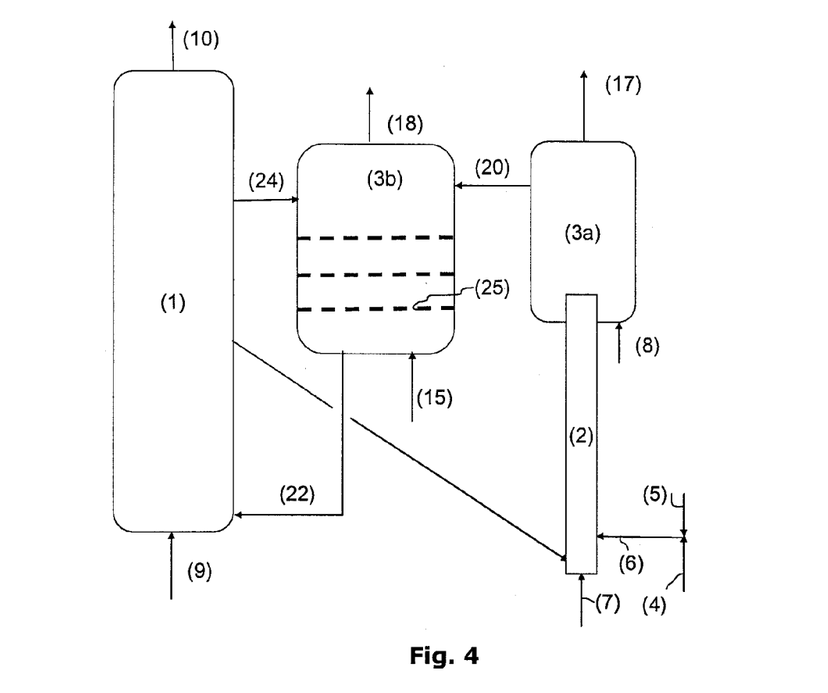

FIG. 4

FIG. 4 describes a third embodiment of the invention, wherein combustion zone (3) comprises two dense-phase fluidized bed reactors in series (3a) and (3b), reactor (3b) being equipped with internals (25) allowing the flow of metal oxide particles to be staged.

Chemical looping combustion is carried out by reduction of the metal oxides in reactors (2) and (3a, 3b).

The liquid feed introduced through line (4) is mixed with an atomization gas introduced through line (5) and the mixture is fed into transport zone (2), which is a substantially elongate reactor, through atomization means (6) allowing to form fine liquid droplets dispersed in the atomization gas. Several injection points are possible. Atomization means (6) are distributed on the wall of the reactor of transport zone (2), substantially in the lower part thereof. Transport zone (2) opens into reactor (3a) of the dense-phase fluidized bed combustion zone where the gas phase and the solid phase are dispersed. All of these gaseous effluents flow into reactor (3a) of the dense-phase fluidized bed combustion zone and leave it through line (17). The gas phase is then essentially made up of $CO_2$ or of ($CO$, $H_2$) depending on the stoichiometric and reaction conditions applied, water vapour and sulfur and nitrogen oxides, . . . . A fluidization gas is introduced through a line (8) at the base of the dense-phase combustion zone into reactor (3a) and it allows homogeneous fluidization over the entire section. This fluidization gas can advantageously be water vapour, a fraction of the gaseous effluents from line (17) or a mixture of water vapour and of effluent fractions from line (17). In order to limit particle entrainment downstream, cyclones or other dedusting means known to the person skilled in the art are arranged in dense-phase combustion zone (3a) or at the outlet thereof on line (17).

The metal oxides are discharged to a reactor (3b), wherein the particles are fluidized in dense phase by a gas flowing in through line (15), at a velocity below the particle transport velocity. In this reactor, combustion of the coke deposited on the particles is completed. The gaseous combustion effluents leave dense-phase fluidized reactor (3b) through line (18), essentially made up of $CO_2$ or of ($CO$, $H_2$) depending on the stoichiometric and reaction conditions applied, water vapour and sulfur and nitrogen oxides. Fluidization gas (15) introduced at the base of reactor (3b) allows homogeneous fluidization over the entire section. This fluidization gas can advantageously be water vapour, a fraction of the gaseous effluents from lines (17) or (18), or a mixture of water vapour and of effluent fractions from lines (17) or (18). In order to limit particle entrainment downstream, cyclones or other dedusting means known to the person skilled in the art are arranged in reactor (3b) or at the outlet thereof on line (18).

The dense-phase fluidized bed contained in reactor (3b) is equipped with internals that make up means (25) allowing the flow of metal oxide particles to be staged. These means are, for example, perforated plates, stacked packings, or sets of bars, baffles or chevrons arranged successively in substantially horizontal planes. The metal oxide is fed into reactor (3b) above the highest row of internals in enclosure (3b) and it is withdrawn below the lowest row of internals in reactor (3b). The metal oxide flow is modified by means (25) and a counter-current flow can be established between the ascending gas and the descending metal oxide, the metal oxide flow in reactor (3b) being close to the flow that can be observed in several successive perfectly stirred reactors.

The metal oxide on which the essential part of the deposited coke has been burned by successive passage through reactors (2), (3a) and (3b) is then discharged to oxidation zone (1) through one or more transport lines (22) that withdraw the solid from the fluidized bed of reactor (3b) or the return legs of the cyclones providing dedusting of the gaseous effluents of reactor (3b).

In oxidation zone (1), the metal oxide reduced by the combustion of the liquid feed is oxidized again on contact with the air introduced into a fluidized reactor operating under either dense phase or circulating bed conditions. The gaseous effluents containing essentially oxygen-depleted air leave oxidation zone (1) in the upper part thereof after being dedusted using means known to the person skilled in the art.

Oxidation zone (1) can consist of a circulating fluidized bed (superficial gas velocity above particle transport velocity) or of a dense-phase fluidized bed (superficial gas velocity below particle transport velocity and above minimum fluidization velocity). In the case of a circulating fluidized bed, part of the oxide circulating in oxidation zone (1) can be recycled at the reactor outlet to the bottom of oxidation zone (1) in the vicinity of air supply means after prior separation by separation means such as cyclones.

The metal oxide, once oxidized again, is then sent partly to transport zone (2) through one or more transport lines (13) opening into transport zone (2) upstream from means (6) allowing atomization of the feed. A fluidization gas (vapour for example) is fed through a line (7) upstream from transport lines (13) to provide fluidization upstream from the contact with the liquid feed. The rest of the metal oxide is directly sent to reactor (3b) of the dense-phase combustion zone through transport line(s) (24) and bypasses transport zone (2). The distribution of the oxide flow rates among lines (13) and (24) is advantageously performed according to the distribution of the combustion in each zone with the aim of minimizing the flow rate of metal oxides circulating in zone (3a). It is also possible to inject all of the metal oxide through line (13), through line (13) and line (14), or through lines (13), (14) and (23).

In a variant, it is possible to arrange reactor (3b) directly beneath reactor (3a), the outer walls of these two reactors coinciding then. Under such conditions, the dense phase of reactor (3a) is extended by continuity in the fluidized dense phase of reactor (3b). The gaseous effluent of reactor (3b) then flows through the dense phase of reactor (3a) without requiring dedusting of the gaseous effluent coming from the dense phase contained in reactor (3b).

It is also possible to consider feeding metal oxide transport zone (2) through recycle of the particles coming from reactors (3a or 3b) of the dense-phase combustion zone, or through a mixture of re-oxidized metal oxides from oxidation zone (1) and of metal oxides from dense-phase combustion reactors (3a or 3b).

For all the implementations provided and conceivable from the invention, the following means allowing to provide sealing between the oxidation and reduction zones, and to control the metal oxide circulation between the various enclosures, can be used:
  in order to provide sealing between the metal oxide oxidation zones and the metal oxide reduction zones, means can be used to limit gas entrainment between these zones. These means consist of either syphons or solid valves (L-shaped valves for example) known to the person skilled in the art, or mechanical valves, also well known, such as slide valves,
  control of the circulation between the various zones can be adjusted either by varying the fluidization flow rates applied in the various syphons and solid valves, or by varying the opening of the mechanical valves, or using the pressure difference between the various zones, by means of valves arranged downstream from these zones on the gaseous effluent discharge lines.

EXAMPLES

The performances of a combustion unit operating under chemical looping combustion conditions and treating a liquid feed consisting of a petroleum vacuum residue whose analysis is given below have been calculated.

TABLE 1

|   | Wt. % |
|---|---|
| C | 85.2 |
| H | 10.3 |
| N | 0.5 |
| S | 4 |

The metal oxide used is a titanium and iron ore capable of transferring during chemical looping combustion 1 wt. % oxygen in relation to the mass of particles used. The amount of residue treated by this unit is 30 kg/s. The particle circulation required to provide combustion of the residue is 34,000 t/h.

In a first case, the $CO_2$ capture rate S (corresponding to the amount of $CO_2$ recovered in the residue combustion zone through metal oxide reduction in relation to the total amount of $CO_2$ emitted by the facility) is calculated for various unit configurations.

In example 1, the reaction zone considered for providing combustion of the residue through metal oxide reduction is a simple fluidized bed operating at a superficial gas velocity that is below the metal oxide transport velocity, wherein the residue is injected by atomization means on the enclosure wall.

In example 2, the reaction zone considered for providing combustion of the residue through metal oxide reduction consists of a series of reactors as described in FIG. 2. The amount of metal oxides fed into the transport zone through line (13) comes from the oxidation zone and corresponds to a flow rate of approximately 2000 t/h. The rest of the circulating metal oxide is directly fed into the dense-phase combustion zone through line (12).

In example 3, the reaction zone considered for providing combustion of the residue through metal oxide reduction consists of a series of reactors as described in FIG. 3, considering a succession of two metal oxide reduction zones (3a) and (3b). In this case, the amount of metal oxides fed into the transport zone through line (13) comes from the oxidation zone and corresponds to a flow rate of approximately 2000 t/h. The rest of the circulating metal oxide is also fed into the dense-phase combustion zone in zone (3a) through line (14).

In example 4, the reaction zone considered for providing combustion of the residue through metal oxide reduction consists of a series of reactors as described in FIG. 3, but considering a succession of 5 metal oxide reduction zones in series (3a, 3b, 3c, 3d and 3e). In this case, the amount of metal oxides fed into the transport zone through line (13) comes from the oxidation zone and corresponds to a flow rate of approximately 2000 t/h. The rest of the circulating metal oxide is also fed into the dense-phase combustion zone in zone (3a) through line (14).

The atomization means used for introducing the feed are, in all cases, identical in their principle and their implementation conditions. Besides, the temperatures of the metal oxide leaving each reduction and oxidation zone are assumed to be identical from one example to the other, respectively equal to 900° C. and 950° C. The pressure at the outlet of zones (1) and (3) is close to 1.2 bar abs.

The $CO_2$ capture rate S is first calculated by considering a constant metal oxide inventory M in the overall residue combustion zone through metal oxide reduction, equal to approximately 1130 t. The results of this calculation are given in Table 2:

TABLE 2

| Example | 1 | 2 | 3 | 4 |
|---|---|---|---|---|
| M (T) | 1130 | 1130 | 1130 | 1130 |
| S (%) | 79 | 88 | 91.6 | 94 |

The metal oxide inventory M required in the overall residue combustion zone through metal oxide reduction in order to reach a 90% $CO_2$ capture rate S is then calculated. The results of this calculation are given in Table 3:

TABLE 3

| Example | 1 | 2 | 3 | 4 |
|---|---|---|---|---|
| M (T) | 1616 | 1182 | 985 | 788 |
| S (%) | 90 | 90 | 90 | 90 |

Comparison of examples 1 and 2 shows that implementing the method according to the invention with residue injection into a transport zone (2) allows to substantially improve the rate S of $CO_2$ capture in the fumes of the metal oxide reduction zone (Table 2), or to substantially reduce the particle inventory (and therefore the size of the reactors and the investment required for implementing the method) required for combustion while maintaining a constant $CO_2$ capture rate S equal to 90%. This is due to a substantial decrease in the amount of coke formed upon contact of the metal oxide particles with the finely atomized residue.

Comparing examples 2, 3 and 4 shows that the increase in the number of reactors in dense-phase fluidized bed combustion zone (3) allows to improve capture rate S when the same inventory is distributed among several fluidized reactors in series, or to significantly reduce the required inventory and thus the size of the reactors and the investment required for implementing the combustion method while maintaining a constant $CO_2$ capture rate S equal to 90%. This is due to a better control of the particle flow during dense-phase reduction.

The invention claimed is:

1. An improved method for chemical looping combustion of at least one liquid hydrocarbon feed, comprising:
    atomizing the at least one liquid hydrocarbon feed with an atomization gas so as to form an atomized liquid hydrocarbon feed comprising finely dispersed liquid droplets in the atomization gas and to feed it into a substantially elongated and substantially vertical metal oxide particle transport zone, the metal oxide particle transport zone being provided upstream from a combustion zone comprising at least one dense-phase fluidized bed, the metal oxide particle transport zone opening into the at least one dense-phase fluidized bed of the combustion zone;
    feeding metal oxide particles to the metal oxide particle transport zone;
    vaporizing the atomized liquid hydrocarbon feed when in contact with the metal oxide particles in the transport zone to provide a vaporized hydrocarbon feed, the operating conditions in the transport zone being so selected that the superficial gas velocity in the transport zone after vaporization of the atomized liquid hydrocarbon feed is higher than the transport velocity of the metal oxide particles allowing the metal oxide particles to be transported while minimizing the energy dissipation in form of pressure drop;
    sending all of the effluents from the transport zone to the at least one dense-phase fluidized bed of the combustion zone, the vaporized hydrocarbon feed and metal oxide particles flowing together in the same direction into a first portion of the at least one dense-phase fluidized bed of the combustion zone, the combustion zone allowing reduction of the metal oxide particles.

2. An improved chemical looping combustion method as claimed in claim 1, wherein the dense-phase fluidized bed in the combustion zone is so dimensioned that the hydrodynamics of the particles in the dense-phase fluidized bed(s) correspond to at least two perfectly stirred reactors in series or to at least two fluidized bed stages in series.

3. An improved chemical looping combustion method as claimed in claim 1, wherein the atomization means are arranged on a wall of a reactor of the transport zone and so selected as to form a jet oriented towards the centre of the transport zone.

4. An improved chemical looping combustion method as claimed in claim 1, wherein the liquid feed droplets injected have a Sauter mean diameter ranging between 0.5 and 2 times the mean diameter of the particles.

5. An improved chemical looping combustion method as claimed in claim 1, further comprising transporting the metal oxide particles reduced in the combustion zone to an oxidation zone and oxidizing the metal oxide particles in the oxidation zone, wherein the metal oxide particles reach the transport zone from the oxidation zone through a line, or through recycle of the particles coming from the combustion zone, or in form of a mixture of re-oxidized metal oxides from the oxidation zone and of metal oxides from the combustion zone, and
    wherein the main part of the combustion of coke deposited on the metal oxide particles is achieved in the combustion zone such that gaseous effluents of the oxidation zone comprise less than 10% of the $CO_2$ resulting from the combustion of the liquid feed fed into the transport zone.

6. An improved chemical looping combustion method as claimed in claim 1, further comprising transporting the metal oxide particles reduced in the combustion zone to an oxidation zone and oxidizing the metal oxide particles in the oxidation zone, wherein metal oxide particles coming directly from the oxidation zone are fed into the dense-phase fluidized bed(s) of the combustion zone, so that a fraction less than or equal to 50% of the total amount of metal oxide particles circulating between the oxidation zone and the combustion zone takes part in the vaporization of the liquid feed in the transport zone.

7. An improved chemical looping combustion method as claimed in claim 1, wherein the gas and the particles from the transport zone are fed together to the base of at least one fluidized bed of the combustion zone, the upper part of the transport zone being equipped with dispersion means in said fluidized bed.

8. An improved chemical looping combustion method as claimed in claim 1, wherein the gas and the particles are separated at an outlet of the transport zone:
either to feed separately into the combustion zone the gas freed of the major part of the metal oxide particles and the metal oxide particles freed of the major part of the gas,
or to feed into the combustion zone the metal oxide particles freed of the major part of the gas, and to discharge the gas phase out of the combustion zone.

9. An improved chemical looping combustion method as claimed in claim 1, wherein the liquid feed is made up of hydrocarbon fractions, alone or in admixture, less than 10% thereof having a boiling point temperature below 340° C.

10. An improved chemical looping combustion method as claimed in claim 1, wherein at least one dense-phase fluidized bed of the combustion zone is equipped with means allowing the flow of the metal oxide particles to be staged.

11. An improved chemical looping combustion method as claimed in claim 1, wherein the combustion zone comprises at least two dense-phase fluidized bed reactors arranged in series.

12. A device for chemical looping combustion of at least one liquid hydrocarbon feed, comprising:
a substantially elongate and substantially vertical metal oxide particle transport zone comprising:
liquid feed injection means comprising means for mixing the at least one liquid hydrocarbon feed with an atomization gas arranged on the periphery of said transport zone upstream of an outlet of the transport zone to form an atomized liquid hydrocarbon feed,
feed means for feeding metal oxide particles to the transport zone upstream of the outlet of the transport zone for vaporization of the atomized liquid hydrocarbon feed when in contact with at least part of the metal oxide particles in the transport zone to provide a vaporized hydrocarbon feed,
a combustion zone for the vaporized hydrocarbon feed through metal oxide particle reduction, comprising at least one dense-phase fluidized bed, the transport zone being arranged upstream from said combustion zone and opening into the at least one dense-phase fluidized bed of the combustion zone such that the vaporized hydrocarbon feed and metal oxide particles flow together in the same direction into a first portion of the at least one dense-phase fluidized bed of the combustion zone, wherein at least a part of the metal oxide particles comprise coke deposited during at least the vaporization of the at least one liquid hydrocarbon feed and wherein the main part of the combustion of coke is achieved in the combustion zone such that gaseous effluents of an oxidation zone for the metal oxide particles comprise less than 10% of the $CO_2$ resulting from the liquid feed fed into the transport zone.

13. A device as claimed in claim 11, wherein the combustion zone comprises a number of dense-phase fluidized beds, in one or more combustion reactors, greater than two.

14. A device as claimed in claim 11, wherein the metal oxide particle feed means comprise a transport line from the oxidation zone, and/or a recycle line for the particles coming from the combustion zone.

15. A device as claimed in claim 11, wherein the transport zone comprises, at the outlet thereof, dispersion means for gas and solid particles dispersion in the combustion zone.

16. A device as claimed in claim 11, wherein the transport zone comprises, at the outlet thereof, gas and solid particles separation means.

17. A method as claimed in claim 1 for $CO_2$ capture.

18. A method as claimed in claim 16, wherein $CO_2$ capture rate S is above 90%.

19. A method as claimed in claim 1 for energy production.

20. An improved chemical looping combustion method as claimed in claim 1, further comprising transporting the metal oxide particles reduced in the combustion zone to an oxidation zone and oxidizing the metal oxide particles in the oxidation zone, wherein metal oxides coming directly from oxidation zone are fed into the at least one dense-phase fluidized bed of the combustion zone so that a first fraction of 50% to 95% of the total amount of metal oxides circulating between the oxidation zone and the combustion zone is directly fed from the oxidation zone into the at least one dense-phase fluidized bed of the combustion zone, and a second fraction less than or equal to 50% of the total amount of metal oxides circulating between the oxidation zone and the combustion zone is directly fed from the oxidation zone into the transport zone to take part in the vaporization of the liquid hydrocarbon feed in the transport zone.

21. A device as claimed in claim 11, further comprising an oxidation zone in which metal oxide particles that have been reduced in the combustion zone are oxidized, wherein the combustion zone comprises a transport line from the oxidation zone to directly feed the combustion zone with a first fraction of 50% to 95% of the total amount of metal oxides circulating between the oxidation zone and the combustion zone, and wherein the feed means for feeding metal oxide particles to the transport zone comprises a transport line from the oxidation zone to feed the transport zone with a second fraction less than or equal to 50% of the total amount of metal oxides circulating between the oxidation zone and the combustion zone.

* * * * *